US010565682B2

(12) United States Patent
Castorena Martinez

(10) Patent No.: US 10,565,682 B2
(45) Date of Patent: Feb. 18, 2020

(54) CONSTRUCTING MAP DATA USING LASER SCANNED IMAGES

(71) Applicant: Ford Global Technologies, LLC, Dearborn, MI (US)

(72) Inventor: Juan Castorena Martinez, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 542 days.

(21) Appl. No.: 15/345,448

(22) Filed: Nov. 7, 2016

(65) Prior Publication Data
US 2018/0130176 A1 May 10, 2018

(51) Int. Cl.
G01S 17/00 (2006.01)
G06T 3/40 (2006.01)
G01S 7/48 (2006.01)
G01S 17/89 (2020.01)
G06T 5/00 (2006.01)
G06T 5/10 (2006.01)

(52) U.S. Cl.
CPC .......... *G06T 3/4038* (2013.01); *G01S 7/4808* (2013.01); *G01S 17/89* (2013.01); *G06T 5/002* (2013.01); *G06T 5/10* (2013.01); *G06T 2207/20048* (2013.01)

(58) Field of Classification Search
CPC ..................................... G08B 17/12
See application file for complete search history.

(56) References Cited

U.S. PATENT DOCUMENTS

| 3,897,150 | A | 7/1975 | Bridges et al. |
| 6,526,352 | B1 | 2/2003 | Breed et al. |
| 7,135,992 | B2 | 11/2006 | Karlsson et al. |
| 8,364,334 | B2 | 1/2013 | Au et al. |
| 8,825,391 | B1 | 9/2014 | Urmson et al. |
| 9,097,800 | B1 | 8/2015 | Zhu |
| 9,103,671 | B1 | 8/2015 | Breed et al. |
| 2002/0122604 | A1* | 9/2002 | Woodford ........... G01S 13/9035 382/280 |
| 2004/0047518 | A1* | 3/2004 | Tiana ........................ G06T 5/50 382/284 |
| 2004/0061777 | A1* | 4/2004 | Sadok .................. G08B 17/125 348/83 |

(Continued)

OTHER PUBLICATIONS

Gong et al., "Automated road extraction from LiDAR data based on intensity and aerial photo", IEEE Xplore Digital Library, IEEE.org, Conference date Oct. 16-18, 2010, added to IEEE Xplore Nov. 29, 2010.

(Continued)

Primary Examiner — Hovhannes Baghdasaryan
(74) Attorney, Agent, or Firm — Frank A. MacKenzie; Bejin Bieneman PLC

(57) ABSTRACT

A computer that includes a processor and memory that stores processor-executable instructions. The processor can be programmed to: generate a plurality of transform patch images (PTPIs) by applying a mathematical transform operator to a plurality of map-perspective patch images (PMPPIs) received from at least one vehicle laser-scanner; combine at least some of the PTPIs into a single patch image; and construct a map patch image using the single patch image.

20 Claims, 8 Drawing Sheets

(56) References Cited

U.S. PATENT DOCUMENTS

| | | | |
|---|---|---|---|
| 2004/0263169 A1* | 12/2004 | Mitchell | G01R 33/56 |
| | | | 324/309 |
| 2005/0100208 A1* | 5/2005 | Suzuki | G06T 5/007 |
| | | | 382/157 |
| 2007/0219720 A1* | 9/2007 | Trepagnier | B60W 30/00 |
| | | | 701/300 |
| 2008/0033645 A1 | 2/2008 | Levinson et al. | |
| 2010/0097455 A1* | 4/2010 | Zhang | G06K 9/00798 |
| | | | 348/119 |

OTHER PUBLICATIONS

Hofle et al., "Correction of laser scanning intensity data: Data and model-driven approaches", ISPRS Journal of Photogrammetry & Remote Sensing 62 (2007) 415-433.

Kashami et al., "A Review of LIDAR Radiometric Processing: From Ad Hoc Intensity Correction to Rigorous Radiometric Calibration", Sensors 2015, No. 15, pp. 28099-28128, Nov. 2015.

Levinson et al., "Map-Based Precision Vehicle Localization in Urban Environments", Robotics Science and Systems, 2007.

Levinson et al., "Robust vehicle localization in urban environments using probabilistic maps", IEEE International Conference on Robots and Automation, May 2010, pp. 4372-4378.

Levinson et al., "Unsupervised calibration of multi-beam lasers", International Symposium on Experimental Robots (ISER), 2010.

Steder et al., "Maximum Likelihood Remission Calibration for Groups of Heterogeneous Laser Scanners", International Symposium on Robotics and Automation, May 2015.

\* cited by examiner

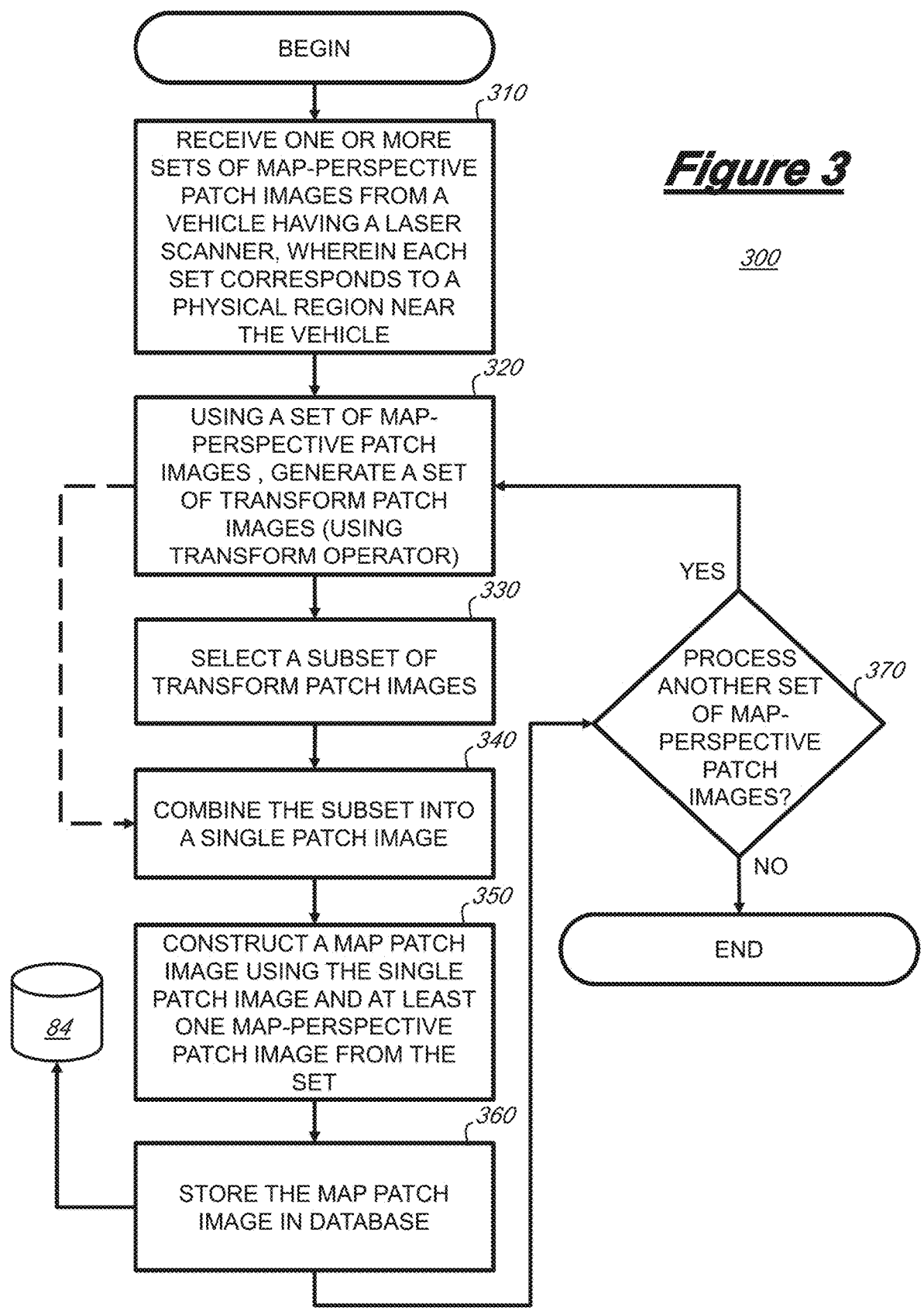

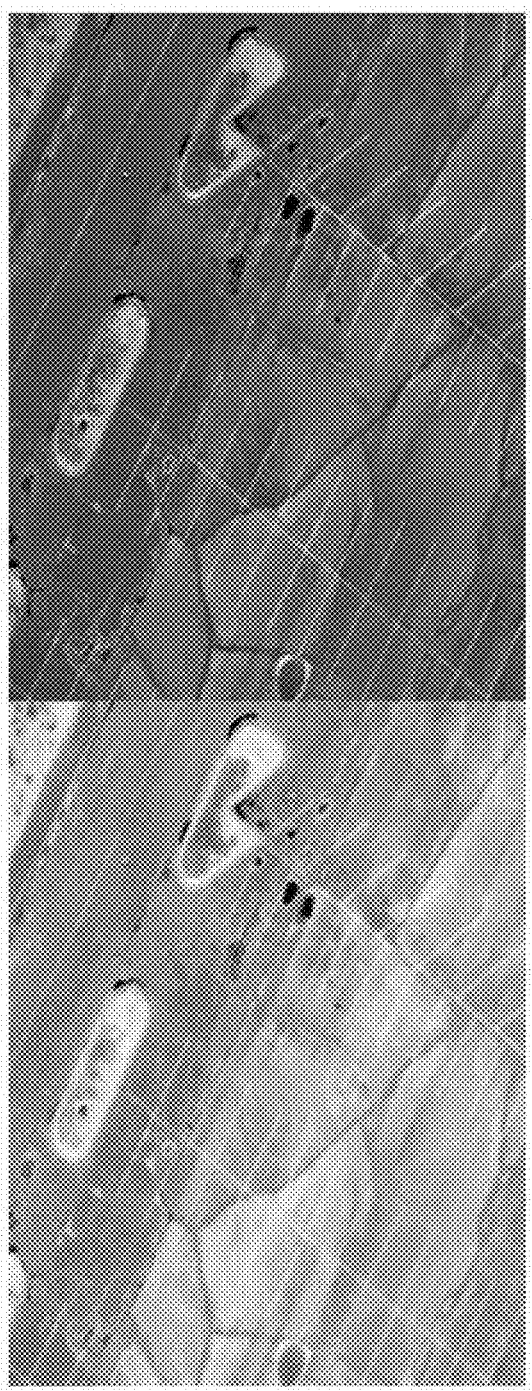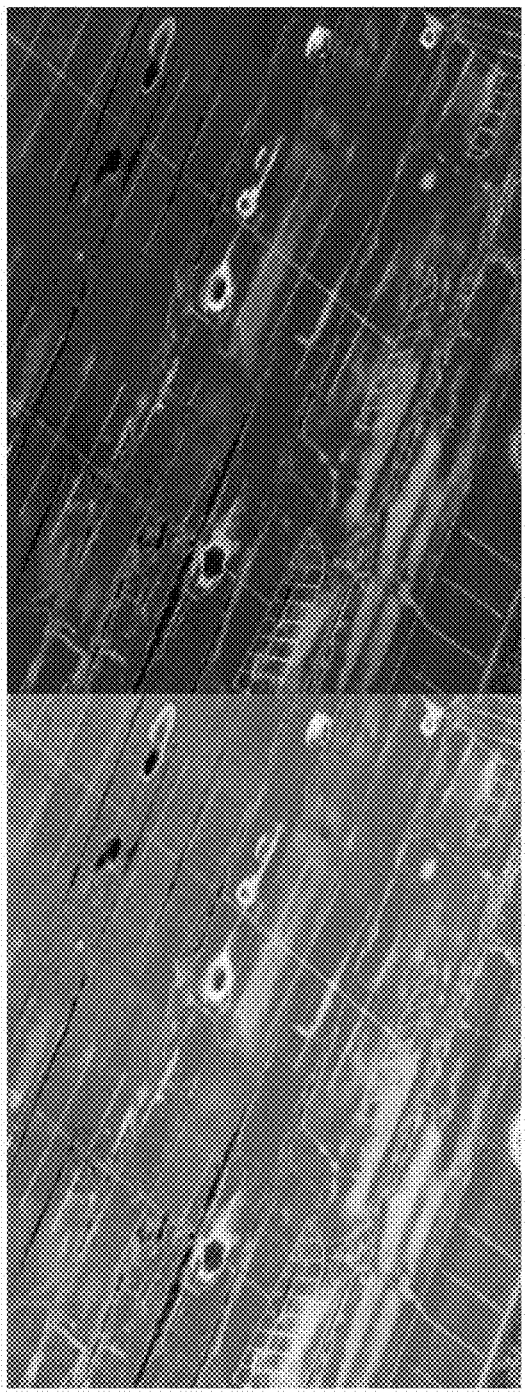
Figure 10

CONSTRUCTING MAP DATA USING LASER SCANNED IMAGES

BACKGROUND

Some vehicles may be configured to utilize a technique known as localization to operate autonomously. According to this technique, the vehicle may drive—at least in part—using stored, onboard digital maps. The quality of these digital maps can impact the successful operation of the autonomously-operated vehicle. Thus, there is a need to provide digital maps of high quality.

BRIEF DESCRIPTION OF THE DRAWINGS

FIG. 3 a flow diagram of a method of generating map patch images.

FIG. 10 illustrates contrast enhancement images obtained during testing and experimentation.

DETAILED DESCRIPTION

Figure 1:
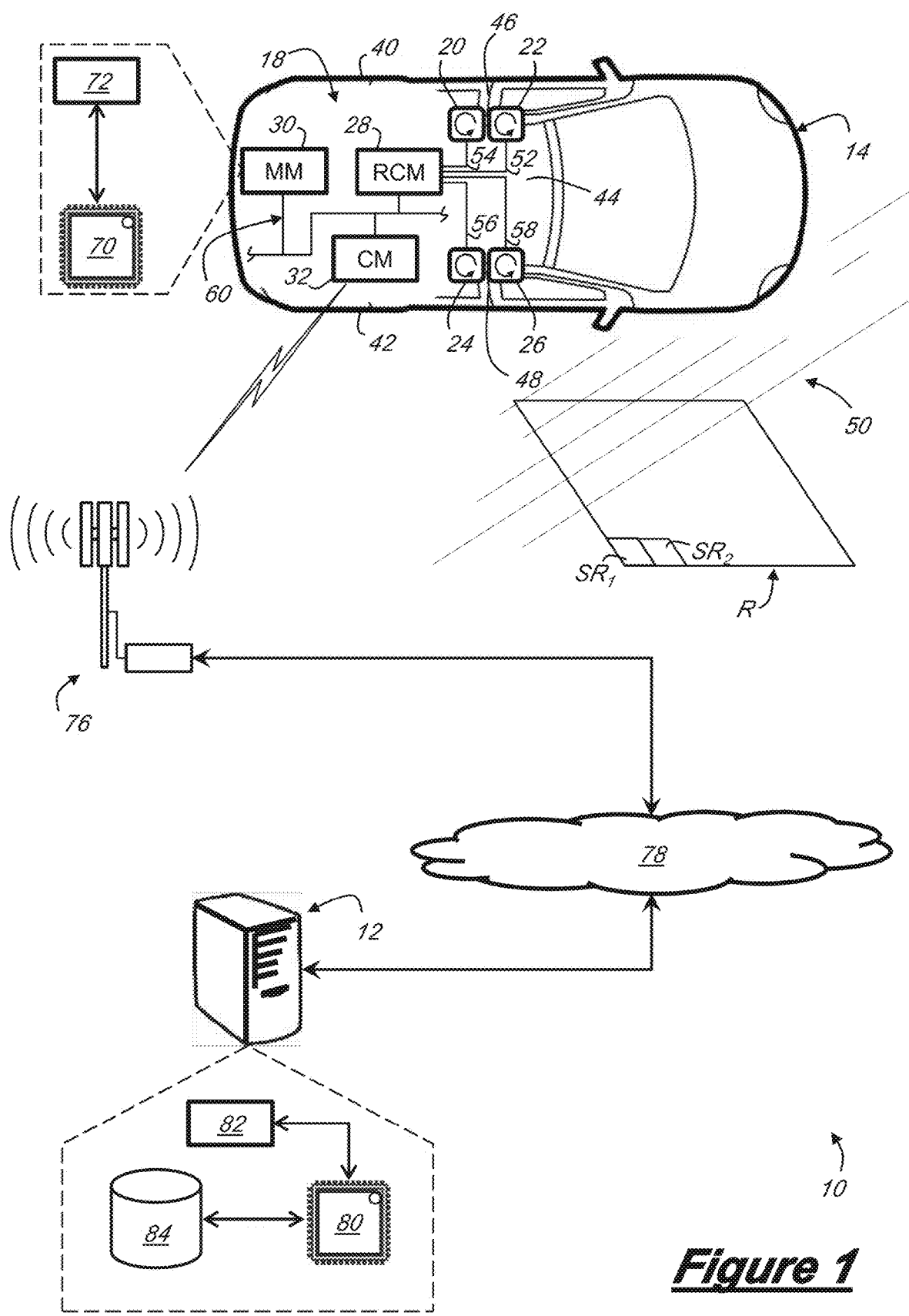
FIG. 1 illustrates a map-generating system according to one illustrative embodiment, the system including a computer that is configured to receive laser scanned images and generate map patch images therefrom.

FIG. 1 illustrates a map-generating system 10 that includes a remote server or computer 12 that generates digital maps or map files by using data collected from a plurality of vehicles (such as the illustrated and exemplary vehicle 14). The map files may be programmed into new vehicles sold by a vehicle manufacturer associated with the remote server 12, or may be downloaded and used by one or more of the plurality of vehicles via so-called over-the-air (OTA) updates. According to one embodiment, the digital map files are used by autonomously-operated vehicles using a technique known in the art as localization, wherein the vehicle navigates roadways at least partially using one or more map files stored in vehicle memory. As will be explained more below, vehicles having laser scanners or other suitable sensing devices may provide localization data that can be used to navigate the roadway, as well as create new digital map files and/or improve existing map files. Thus, it should be appreciated that the vehicle 14 shown in FIG. 1 is merely one example of a vehicle that can provide localization data to the remote server 12; in a preferred map-generating system embodiment, many vehicles provide such data.

Vehicle 14 may be a passenger car or any other suitable vehicle, including a motorcycle, truck, sports utility vehicle (SUV), recreational vehicle, marine vessel, aircraft, autonomous robot, or the like that includes a sensor system 18 that is adapted to collect localization data within map-generating system 10. For example, sensor system 18 includes a number of vehicle hardware modules such as a plurality of laser scanners 20-26, a restraint control module (RCM) 28 coupled to scanners 20-26, a mapping module (MM) or computer 30, and a communication module 32. The sensor system 18 may be used by other vehicle systems as well—e.g., during autonomous or partially-autonomous vehicle operation, etc.

Laser scanners 20-26 may be identical; therefore, only one will be described herein. According to one non-limiting embodiment, scanner 20 may be a LiDAR (light detection and ranging) device. LiDAR is an active scanning technique which includes emitting light signal (from an emitter, not shown) and measuring a so-called 'return' (at a detector, not shown)—the return comprising a reflectance of the emitted signal. In the discussion below, the emitter/detector pair is sometimes referred to as an 'observer;' and a single LiDAR device may have multiple 'observers.' In at least one embodiment, scanner 20 includes 32 emitter/detector pairs, wherein each emitter fires a signal every 1.5 microseconds ($\mu s$), and each detector measures a reflectance return (e.g., a reflectivity magnitude) of a light beam fired from its corresponding emitter. Of course, other embodiments are also possible—e.g., each scanner 20 instead may have 16 pairs, 64 pairs, etc., and scanning rates may vary as well. As LiDAR techniques and LiDAR devices are generally known in the art, their implementation will not be discussed further herein.

Individually or collectively, the scanners 20-26 may be arranged to acquire localization data from the vehicle's environment or surroundings (e.g., a 360° view around vehicle 14). In at least one embodiment, scanners 20-22 may be positioned on one side 40 of vehicle 14, whereas scanners 24-26 may be positioned on an opposite side 42. In the illustrated embodiment (FIG. 1), scanners 20-22 are located proximate to a roof region 44 of vehicle 14 near B-pillar 46, and scanners 24-26 are located proximate to the roof region 44 of vehicle 14 nearB-pillar 48. Of course, this is merely a non-limiting example. In at least one implementation, the orientation of each of the respective scanners 20-26 is adapted to scan the surrounding roadway 50. The scanners 20-26 may image the roadway and any other suitable physical region around or near the vehicle 14; in at least one non-limiting implementation, the images determined by the scanners 20-26 include a range of 0-120 meters radially outwardly of vehicle 14.

The scanners may output localization data in the form of uncalibrated or raw light reflectance image data. For example, the scanners 20-26 themselves may not require an occasional calibration sequence. As used herein, a calibration sequence of the laser scanner is a calibration correction, adjustment, and/or rectification associated with the scanner's measuring instrumentation or the acquired measurements themselves occurring after the laser scanner has been assembled at its manufacturer and/or after the laser scanner has been installed in vehicle 14. Non-limiting examples of a calibration sequence include a target-based and target-less calibration, the natures of which will be appreciated by skilled artisans. It also should be appreciated that use of uncalibrated reflectivity data saves processing time; further, skilled artisans will appreciate that in autonomous or partially autonomous vehicles, performing even an occasional calibration sequence may be impractical because target based approaches are too costly and target-less based approaches are labor intensive (e.g., it takes a skilled artisan about a day to complete the calibration process).

Typically, RCM 28 may control and communicate with vehicle airbags or other vehicle safety systems. However, in at least one embodiment, a microprocessor-based controller within restraint control module 28 collects localization data from scanners 20-26 via discrete wired or wireless communication links 52-58. Of course, other communication links are possible (e.g., a bus or similar connection).

While the collected localization data also may be used by navigation systems within vehicle 14, the localization data—via an intra-vehicle communication network 60—may be provided to the mapping module 30 for on-board storage or on-board vehicle map-generation, to the communication module 32 for transmission to remote server 12 for server-based map-generation, or both. Non-limiting examples of communication network 60 include a controller area network (CAN) bus, Ethernet, a Local Interconnect Network (LIN), and any other suitable wired or wireless communications network.

Mapping module 30 may be any suitable vehicle hardware system module or device adapted to store localization data and/or generate digital map data using the localization data received from the laser scanners 20-26, as well as any other suitable navigation or position-sensing sensor—including but not limited to wheel speed sensors, wheel orientation sensors, engine state sensors, engine speed sensors, global positioning system (GPS) sensors, accelerometers, gyroscopes, inertial measurement sensors, and the like. According to at least one implementation, the mapping module 30 stores localization data from the laser scanners at least until the data can be transmitted to the remote server 12. This may occur, e.g., via a wireless data upload (described below) or via an Ethernet, a so-called OBD-II connection (e.g., by an authorized service technician), or the like.

Figure 2:
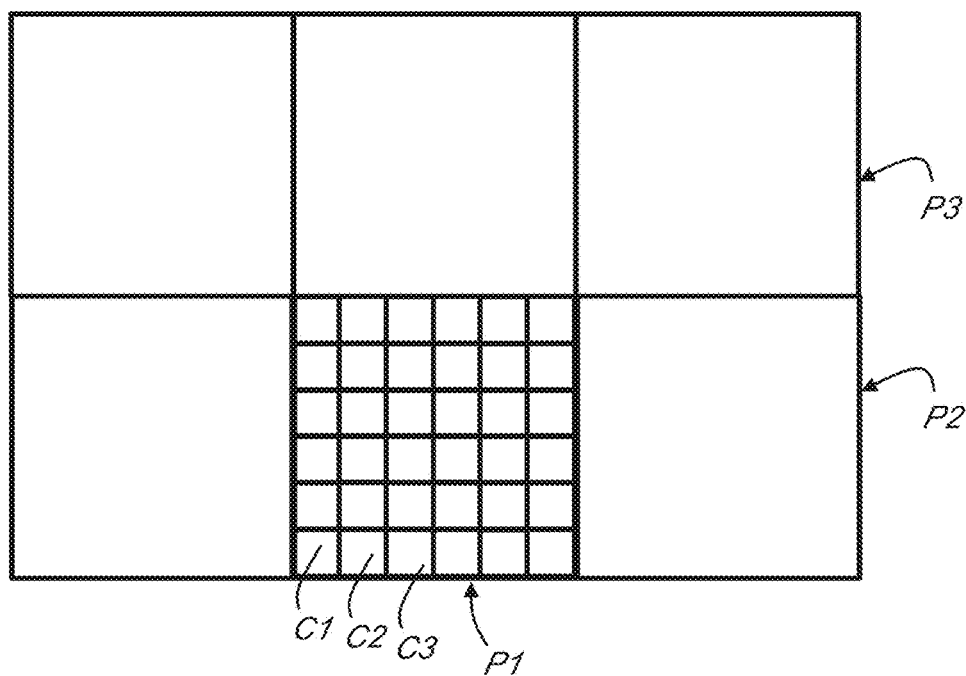
FIG. 2 is a schematic view of map patch images and map cells associated with a laser scanner.

In at least one embodiment, the mapping module 30 generates map patch images or digital map files using the localization data. As used herein, a digital map or digital map file is a collection of map patch images wherein at least some of the map patch images are adjacently arranged (e.g., edge-to-edge, partially overlaying, etc.). As used herein, a map patch image is a collection of map cells wherein at least some of the map cells are adjacently arranged (e.g., edge-to-edge, partially overlaying, etc.). FIG. 2 illustrates several map patch images P1, P2, P3, . . . (collectively, a portion of a digital ground plane that corresponds to roadway 50); each of the patch images (e.g., P1) can include multiple map cells C1, C2, C3, . . . (as illustratively shown). Further, when imaged by one of the laser scanners 20-26, the map patch image P1 may correspond to a region R of roadway 50 (see FIG. 1). Similarly, the map cells C1, C2, . . . may correspond to sub-regions SR1, SR2, . . . on the roadway 50 (e.g., having a predetermined size or area). As will be explained in greater detail below, the mapping module 30 may generate map patch images by receiving localization data from each of the laser scanners 20-26 which image (or attempt to image) the same region R of roadway. Of course, each of the laser scanners 20-26 ultimately image many regions of roadway 50 similar to region R and provide this to module 30 as well.

To carry out the procedures described above, the mapping module 30 includes one or more processors 70 and memory 72. Processor 70 can be any type of device capable of processing electronic instructions, non-limiting examples including a microprocessor, a microcontroller or controller, an application specific integrated circuit (ASIC), etc.—just to name a few. Processor 70 may be dedicated to mapping module 30, or it may be shared with other vehicle systems and/or subsystems. As will be apparent from the description which follows, module 30 may be programmed to carry out at least a portion of the method described herein—e.g., being configured to execute digitally-stored instructions, which may be stored in memory 72.

Memory 72 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 72 may store one or more computer program products which may be embodied as software, firmware, or the like.

As discussed below, it may be desirable to perform map-generating procedures at the remote server 12 in addition to or in lieu of executing those procedures at the mapping module 30. The communication module 32 may facilitate this communication. For example, module 32 may be a telematics-equipped device that includes any suitable hardware, software, etc. to enable cellular communication (e.g., LTE, CDMA, GSM, etc.), short range wireless communication technologies (e.g., Bluetooth, BLE, Wi-Fi, etc.), or a combination thereof. According to one embodiment, the communication module 32 is configured to wirelessly transmit the localization data to the remote server 12 using cellular and/or short range wireless communication so that the server 12 may use this data to generate digital maps.

Localization data transmitted by the vehicle communication module 32 may be received by the remote server 12 via any suitable telecommunication techniques. For illustrative purposes only, a wireless carrier system 76 (showing an illustrative cell tower and base station) is shown receiving wireless communication from the communication module 32. Further, the wireless carrier system 76 may be coupled to a land communication network 78 which ultimately is connected to the remote server 12. The wireless carrier system 76 may be a cellular telephone system that may include so called eNodeBs, serving gateways, base station transceivers, etc. utilizing any suitable cellular technology (e.g., LTE, CDMA, GSM, etc.).

The land communication network 78 may include any wired network coupled to the wireless carrier system 76 enabling connectivity to public switched telephone network (PSTN) such as that used to provide hardwired telephony, packet-switched data communications, internet infrastructure, and the like. Both system 76 and network 78 are generally known in the art and will not be described further herein. Of course, land communication network 78 is not required in all embodiments; e.g., remote server 12 may receive wireless communications from vehicle 14 via the wireless carrier system 76, via a satellite network (not shown), or the like.

The remote server 12 may be any suitable computer or computing system that is specially-configured to receive localization data from vehicles such as vehicle 14 and generate map patch images and/or digital map files in response thereto. In at least one embodiment, the server 12 includes one or more processors 80, memory 82, and one or more databases 84. Processor 80 may have similar or identical features and/or functions as processor 70. For example, processor 80 can be any type of device capable of processing electronic instructions, non-limiting examples including a microprocessor, a microcontroller or controller, an application specific integrated circuit (ASIC), etc.—just to name a few. Processor 80 may be dedicated to server 12, or it may be shared with other server systems and/or subsystems. As will be apparent from the description which follows, server 12 may be programmed to carry out at least a portion of the method described herein. For example, processor 80 can be configured to execute digitally-stored instructions which may be stored in memory 82.

Memory 82 have similar or identical features and/or functions as memory 72. For example, memory 82 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 82 may store one or more computer program products which may be embodied as software, firmware, or the like. In one implementation, at least some of the executable instructions stored on memory 82 are similar or identical to those stored on memory 72; however, this is not required.

Remote server 12 further may include one or more databases 84 to store, among other things, collections of digital map files in a filing system. For example, one or more databases 84 may be dedicated to storing localization data associated with a metropolitan or urban macro-region classified as a so-called Level 4 autonomous driving region. The stored map files in the databases 84 may be checked out or downloaded, updated using processor(s) 80 (as described below), and then uploaded and stored therein again. Furthermore, map files or map patch images may be received from vehicles such as vehicle 14 and stored in databases 84—e.g., and used to supplement, augment, or modify existing map files.

One or more embodiments of the system are described below. It will be appreciated that the discussion that follows is merely one implementation of the system; other implementations will be apparent to those skilled in the art.

Method

FIG. 3 illustrates a method or process 300 of generating or constructing a digital map patch image using the map-generating system 10 described above. The method may be carried out using any suitable computer—e.g., using the vehicle mapping module 30, using remote server 12, or any other suitable computer. For purposes of clarity (and not to be limiting), the method is described with respect to the remote server 12 executing the method 300. An overview of the method is set forth below; after which, the steps are described in greater detail.

In general, processor 80 at server 12 executes instructions stored on memory 82 to carry out the method. For example, processor 80 receives multiple sets of scanning measurements (or so-called map-perspective patch images) from vehicle 14 (step 310). In this embodiment, map-perspective patch images may be sent to the RCM 28 from laser scanners 20-26, sent to the communication module 32 from the RCM 28, and sent to the remote server 12 from the module 32 via a wireless data upload (e.g., a packet data transmission through the wireless carrier system 76 and land system 78). As used herein, a map-perspective patch image is a laser-scanned image of a region R of ground or roadway 50 from the point-of-view of a particular observer (i.e., a particular detector/emitter pair of one of the laser scanners 20-26); further, each map-perspective patch image may include a characteristic range and angle of incidence of the respective laser. It should be appreciated that for each observer to observe region R, the vehicle 14 may need to be in motion. Thus, in an implementation where four laser scanners 20-26 are located on vehicle 14 and each laser scanner 20-26 has 32 emitter/detector pairs, then the server 12 may receive 128 map-perspective patch images for a particular region R. The processor 80 may execute identical or similar steps for each set of map-perspective patch images; thus, the processing of only one will be described in detail.

In step 320, a set of secondary or transform patch images is generated at processor 80. For example, a mathematical transform operator may be applied to some or all of the map-perspective patch images in the set. Non-limiting examples of transform operators include a discrete differentiation gradient operator, a discrete Fourier operator, a discrete wavelet operator, a Radial basis operator, a Noiselet operator, a Curvelet operator, a Laplacian operator, or any other suitable transform method or operator; in at least one implementation, the gradient operator is applied. Thus, as used herein, a transform patch image is data or an image obtained by applying a mathematical transform operator to a map-perspective patch image. In at least one embodiment, transform patch images are generated by the processor 80 for each of the map-perspective patch images associated with region R; however, this is not required.

Step 330 is optional and may be used ultimately to improve the quality (e.g., resolution, contrast, etc.) of the map patch image construction. In step 330, the processor 80 may select a subset of the transform patch images from the set generated in step 320. In this manner, some transform patch images having a relatively low signal-to-noise ratio or any other undesirable quality may be ignored in the steps which follow.

In step 340, the processor 80 may combine (or fuse) all of the transform patch images or only the selected subset of transform patch images into a single fused patch image. In one embodiment, this is a single fused gradient image. According to at least one embodiment, fusion image data into a single image includes combining multiple individual images each of which have first undergone a mathematical transformation (e.g., gradient, Fourier, wavelet, Laplacian, etc.)—so that that the resulting combination (or fused image) represents an improvement in contrast, accuracy, reduction of uncertainty or the like, e.g., when compared to any of the individual images used in the combination.

Figure 4:
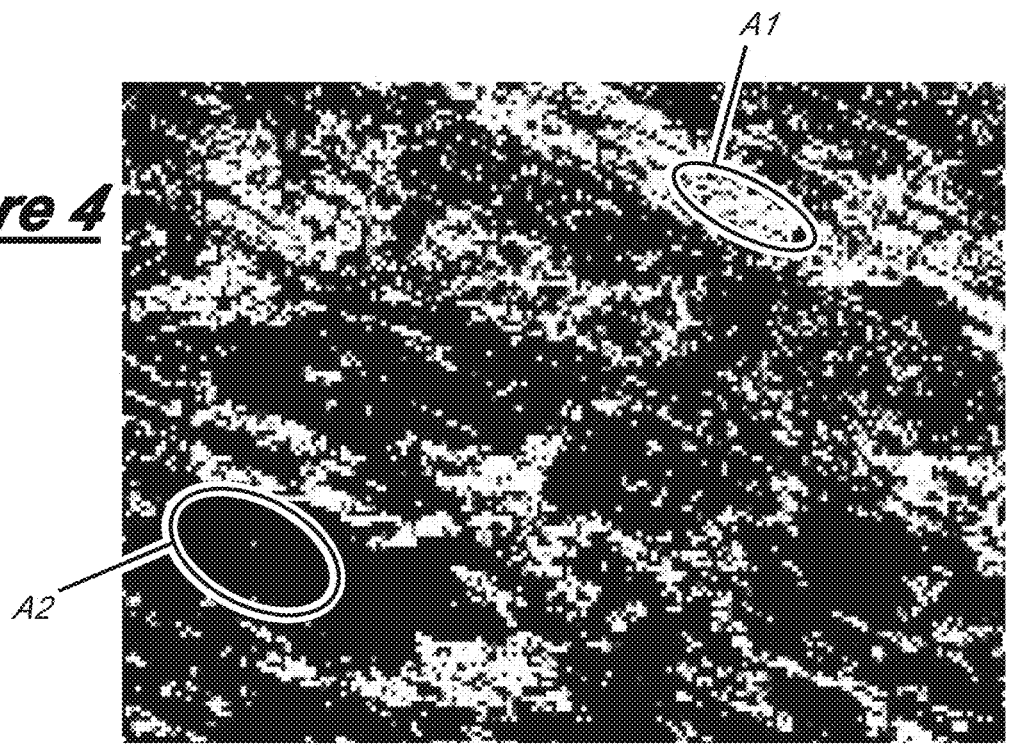
FIG. 4 is an illustrative map-perspective patch image wherein elements of the image are selected using a contrasting technique.

Then in step 350, the processor 80 may construct a map patch image that corresponds with the region R on the roadway 50 by combining or otherwise merging the fused patch image with one or more selected map-perspective patch images. For example, the processor 80 may select one map-perspective patch image that has a relatively strong gradient magnitude when compared with the other map-perspective patch images in the set. According to one embodiment, once selected, the processor 80 may categorize or otherwise determine the most consistent and/or reliable measurement cell values (i.e., those which are less noisy with respect to the remaining cells) of that map-perspective patch image (e.g., using a classification technique); FIG. 4 is illustrative. The map-perspective patch image in FIG. 4 is of region R and includes cells that have consistent and/or reliable measurement value (e.g., indicated in white or a shade of grey), cells which are less reliable or consistent (e.g., indicated in black). For example, area A1 shows multiple cells of the image wherein values are predominantly consistent and/or reliable. Similarly, another area A2 shows multiple cells of the image wherein the reliability or measurement value consistency is predominantly low. These cells may be contiguous; however, this is not required.

In order to improve the quality of the selected map-perspective patch image—which may already have a relatively stronger gradient magnitude than at least most of the remaining map-perspective patch images in the set—the less reliable and/or less consistent cells of that patch image may be replaced using the information provided by corresponding cells from the fused patch image. This may include executing a reverse transform operation on at least those corresponding cells (e.g., of the fused patch image). Once combined, the map patch image is the result in step 350.

Then in step 360, the processor 80 may store the newly-generated map patch image in database 84. Additionally, this map patch image may replace previously stored map patch images that correspond to that region R of ground. Or this newly-generated image further may be processed with other stored map patch images corresponding to region R.

In step 370, the processor 80 may determine whether to process another set of map-perspective patch images—e.g., corresponding with another region of ground 50. For example, if sets of map-perspective patch images received from vehicle 14 remain unprocessed, then processor 80 may loop back and repeat steps 320-370 (for each additional set of map-perspective patch images). If not, method 300 ends.

Of course, it should be appreciated that the processor 80 and/or other computers may arrange and/or merge any or all of the newly-generated map patch images into one or more digital map files. Furthermore, this process may occur repeatedly as other vehicles upload localization data to the remote server 12. Below, some aspects of method 300 are explained in greater detail.

A. Proposed Approach

Step 310

As discussed above, the scanners 20-26 measure ground reflectivity; for purposes of explanation herein, ground reflectivity will be approximated as a uniformly quantized space plane of reflectivities (i.e., an image of reflectivity). Thus, each cell may represent an estimated reflectivity of a ground area of size $\partial x \times \partial x$ (e.g., where $\partial x$ is approximately 10 cm; of course, this is merely one example; other dimensions may be used).

A map of the ground reflectivity may be compactly represented using an extended-value extension of the reflectivities $x \in \mathbb{R}^{N_x \times N_y} \cup \{\infty\}^{N_x \times N_y}$ where Nx and Ny are the number of horizontal and vertical grid cells respectively. Here, the finite values in x represent the occupancy of reflectivity measurements within the gridded map comprised of a total of $N = N_x N_y$ cells. Herein, notation such as $n \in \{1, \ldots, N\}$ is used to index the element cells of x and other similarly sized matrices—e.g., vectorizing them. According to one embodiment, the laser reflectivity measurement model used may be the white Gaussian additive noise (AWGN) model $$y^\phi = \underbrace{f^b(x, \phi)}_{x^\phi} + \epsilon^\phi, \qquad \text{Equation (1)}$$

where $f^b: \mathbb{R} \to \mathbb{R}$ is the linear reflectivity response of laser b at $\phi$ to a surface of reflectivity $x \in \mathbb{R}$, $x^\phi \in \mathbb{R}$ is the surface reflectivity from the perspective of $\phi$, and $\epsilon^\phi \sim \mathcal{N}(0, \sigma_\phi)$ is an independent and identically distributed (i.i.d.) random variable independent of $f^b$. In at least the present embodiment, the set $\phi$ indicates the measurement or perspective parameters; for example, $\phi=(b,\theta,r)$ indicates that a measurement was obtained from one of the laser scanners (20-26) with global index b at an angle of incidence $\theta$ and range r.

When vehicle 14 is scanning or surveying the roadway 50, each reflectivity measurement of the ground may be associated with a cell in a 3-dimensional map depending on the projection of its corresponding range into a global reference frame. These projected measurements can be non-uniformly distributed across the ground depending on the laser scanner configuration, the scanning pattern, and the navigation path of vehicle 14. For illustrative purposes, the set of reflectivity measurements are taken from the perspective of $\phi$ at cell n with $\tilde{y}_n^\phi \in \mathbb{R}^{M_n^\phi}$, where $M_n^\phi$ is the number of recorded reflections. When fixing $\phi$, these measurements follow the AWGN model with the proper extension of terms, for example, the noise term follows $\epsilon_n^\phi \sim \mathcal{N}(0_{M_n^\phi \times M_n^\phi}, \sigma_\phi \cdot I_{M_n^\phi \times M_n^\phi})$. From these measurements, a set of map-perspective patch images are generated with extended value elements $y^\phi \in \mathbb{R}^{N_x \times N_y} \cup \{\infty\}^{N_x \times N_y}$ which represent the map of ground reflectivity from the perspective of $\phi$. These may be defined element-wise as $$[y^\phi]_n = \begin{cases} \dfrac{1}{M_n^\phi} \sum_{m=1}^{M_n^\phi} [\tilde{y}_n^\phi]_m, & \text{for } n \in \Omega^\phi \\ \infty & \text{for } n \notin \Omega^\phi \end{cases} \qquad \text{Equation (2)}$$

for all $\phi \in \Phi$ with $\Phi = \{\phi_1, \phi_2, \ldots \phi_B\}$ including as elements all of the possible perspective parameters from which measurements were collected and $B=|\Phi|$ represents the total number of different perspectives from all observers (e.g., the respective emitter/detector pairs). By generating these map-perspective patch images, a normalization to unbias for the non-uniform number of measurements from an observer and its perspectives in cells is carried out. Also, note that the uncertainty of the elements $[y^\phi]_n$ is now distributed as $\sim \mathcal{N}(0, \sigma_\phi/M_n^\phi)$, essentially reducing noise at each cell by a factor of $M_n^\phi$. In Equation (2), the set $\Omega^\phi$ represents the cell map-occupancy of measurements from $\phi$. To define the complete cell occupancy or domain of the map where measurements were recorded, the map domain S may be a closed subset of $\mathbb{R}^2$ and $\Omega'$ may be the subset of S where there are laser reflectivity measurements available. Thus, the map domain $\Omega'$ can be described as $$\Omega' = \bigcup_{\phi \in \Phi} \Omega^\phi \qquad \text{Equation (3)}$$

of the map-perspective occupancy or domains $\Omega^\Phi$.

Figure 5:
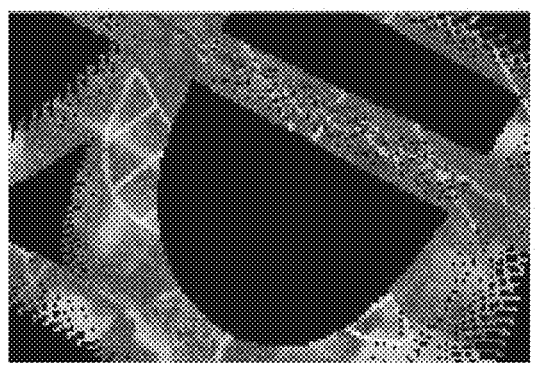
FIGS. 5-8 illustrate a number of map-perspective patch images of a common region of ground provided by different emitter/detector pairs of a laser scanner.
Figure 6:
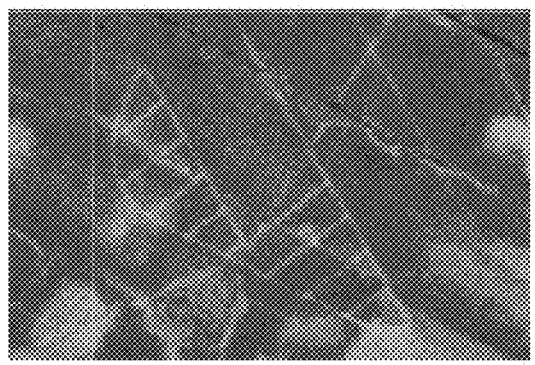
Figure 7:
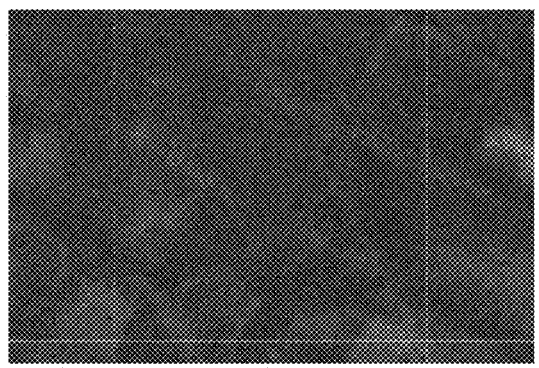
Figure 8:
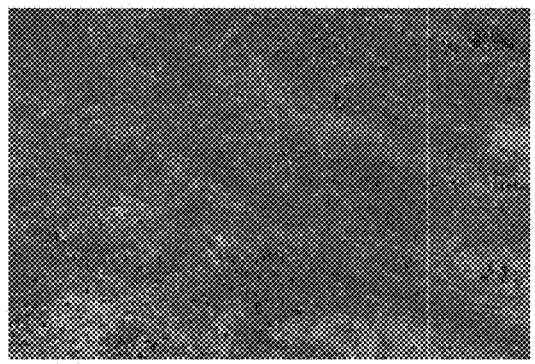

Examples of map-perspective patch images from four different observers are shown in FIGS. 5-8 (e.g., four different detector images, wherein the four detectors are among the 32 detectors of scanner 20). For example, FIG. 5 illustrates a perspective of one detector (detector 1) of laser scanner 20; FIG. 6 illustrates a perspective another detector (detector 16) of laser scanner 20; FIG. 7 illustrates a perspective of another detector (detector 19) of laser scanner 20; and FIG. 8 illustrates a perspective of another detector (detector 21) of laser scanner 20. In general, FIGS. 5-8 illustrate orthographic view of a single region R of the ground infrared reflectivity from the perspective of the given laser scanner (20). In this implementation, patch data (associated with region R) is obtained while mapping the environment with a 360-degree scan Velodyne HDL-32E LIDAR mounted on the roof 44 above the left B pillar of vehicle 14 which is navigating through its environment—wherein FIG. 5 corresponds to a first map-perspective patch image as viewed from the perspective of detector 1, FIG. 6 corresponds to detector 16 with a reduced contrast but with full view of patch domain, FIG. 7 corresponds to detector 19 showing bad contrast characteristic of high ranges and angles of incidence, and FIG. 8 corresponds to detector 21 presenting no contrast between reflectance materials.

Step 320

In step 320 (which follows step 310), a set of secondary or mathematical transform patch images are generated using the map-perspective patch images obtained in step 310. It will be appreciated that—although these have overlapping observations of the same regions (i.e., overlapping occupancies)—the relative perspectives of the map-perspective patch images influence their respective characteristic reflectivity responses. It is desirable to decouple these map-perspective patch images from the perspective parameters by applying a mathematical transform operator (e.g., a gradient operator, a Fourier operator, a wavelet operator, or the like) to each of them. Here, a discrete gradient D: $\mathbb{R}^N \to \mathbb{R}^{N \times 2}$ is used, composed of the matrices Dx: $\mathbb{R}^N \to \mathbb{R}^N$ and Dy: $\mathbb{R}^N \to \mathbb{R}^N$ that represent the first order finite forward difference operators along the horizontal and vertical axes, respectively. Under this representation, the components of the gradients of map-perspective patch images $[Dy^\Phi]_n$ become statistically stationary which allows remote server 12 to operate on each of the images in the set invariantly.

Steps 330-360

In step 330, a subset of transform patch images may be selected or determined—e.g., thereby eliminating transform patch images having undesirably low signal-to-noise ratios. The algorithmic operators here proposed are those of selection, de-noising, and combination (or fusion) of these transform patch images (or in this instance, gradient patch images). A combination of any of the selection and de-noising operators along with the fusion step are compactly represented via the function $$\widehat{Dy} = f_{fusion}(y^{\phi 1}, y^{\phi 2}, \ldots, y^{\phi N}) \quad \text{Equation (4)}$$

where $\widehat{Dy} \in \mathbb{R}^{N \times 2}$ denotes an estimate of the gradient of fused map-perspective patch images of y. The goal of reconstruction may be to recover a digital map patch image estimate of the ground reflectivity x consistent with the fused gradient patch images of the map-perspective patch images and a reference measured data x*. Here, this reconstruction process can be represented by $$\hat{x} = f_{reconstruction}(Dy, x^*) \quad \text{Equation (5)}$$

where $\hat{x} \in \mathbb{R}^{N_x \times N_y}$ denotes the map reconstruction of ground reflectivity.

Figure 9:
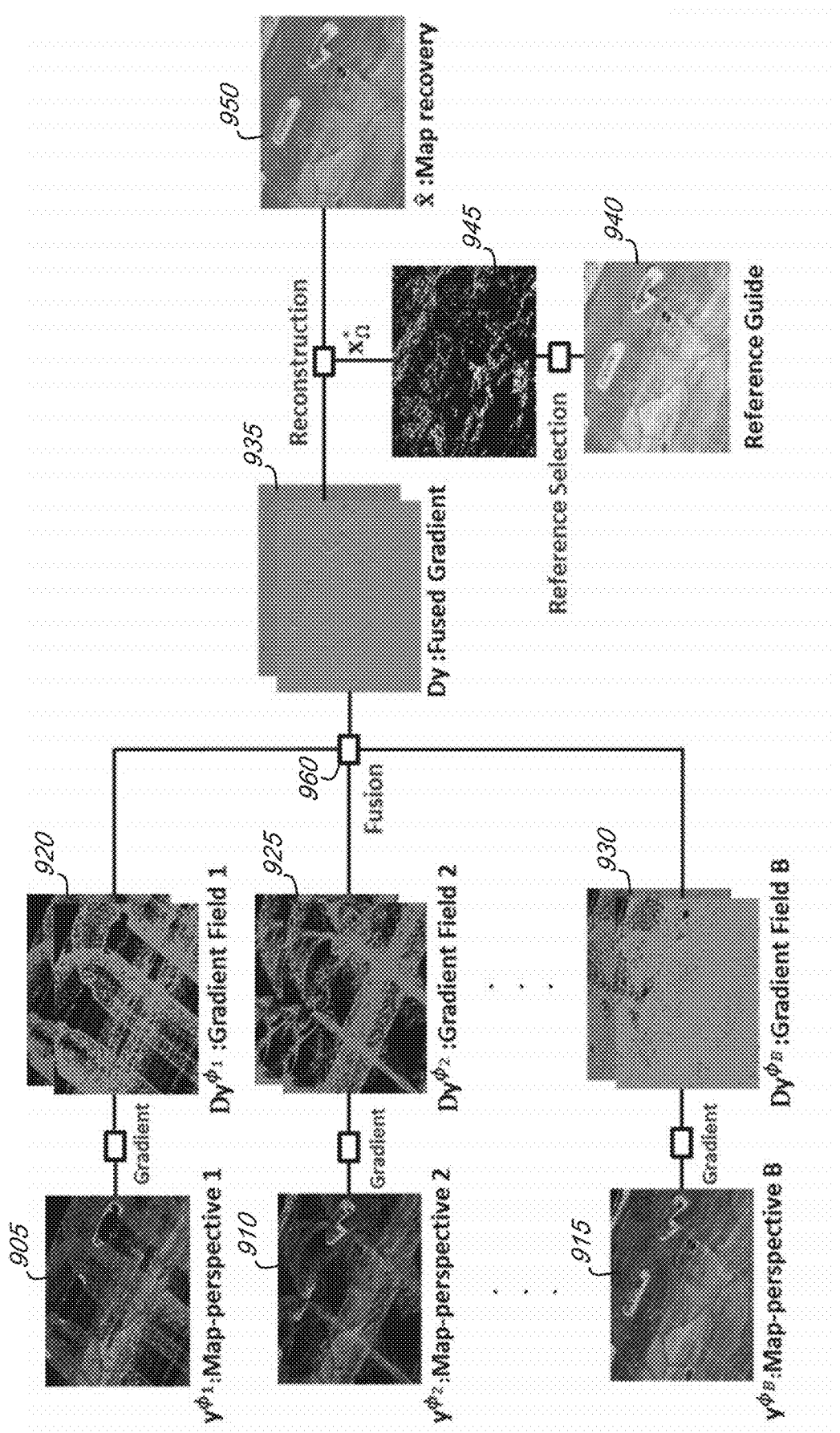
FIG. 9 illustrates a schematic view of a portion of the method shown in FIG. 3.

At least a portion of the method (steps 310-360) also is summarized in FIG. 9—map-perspective patch images 905-915 exemplifying a laser scanner output as viewed from the perspective of particular emitter/detector pairs (step 310); image 950 exemplifying a reconstructed map output or map patch image (step 350); image 940 exemplifying a selected one of the plurality of map-perspective patch images (step 350); and image 945 exemplifying a selection of elements within the image 940 (e.g., white regions being high-contrast areas, black regions being low-contrast areas) (see FIG. 4 and step 350). Thus, the non-black regions (white and grey regions) may define the set $\Omega^\Phi$. Images 905-915 may represent the perspectives obtained by using Equation (2). The gradient field (920-930) for each of these map-perspective patch images may then computed (step 320), followed by a selection, de-noising and fusion implicitly included within the fusion block 960 and obtained using either Equations (9) or (14), discussed below. Finally, as illustrated in FIG. 9, the reflectivity map patch image 950 of the ground surface is reconstructed using as inputs the estimated fused gradient field 955 and a set of reference reflectivity values (945).

In addition to this general formulation, a few basic definitions are included here. First, the sampling matrix $I_\Omega \in \mathbb{R}^{|\Omega| \times N}$ can be the submatrix of the identity obtained by extracting the rows indexed by $\Omega$. This sampling operator matrix is defined element-wise by $$[I_\Omega]_{i,j} = \begin{cases} 1 & i \in \{j \cap \Omega\} \\ 0 & \text{otherwise} \end{cases}. \quad \text{Equation (6)}$$

Thus, the $\Omega$ sampled vector defined by $x_\Omega \in \mathbb{R}^{|\Omega|}$ may be the result of applying the sampling matrix operator $I_\Omega$ as $x_\Omega = I_\Omega x$ (i.e., this operator selects only the elements of x in the set $\Omega$). Second, the projection operator $P_\Omega \in \mathbb{R}^{N \times N}$ can be used to project inputs into the domain $\Omega$. This projection operator is equal to the identity except at the diagonal entries which are not in the domain $\Omega$ in which case these are set to zero. In other words, the projection operator $P_\Omega : \mathbb{R}^N \to \mathbb{R}^N$ is applied element-wise as $$[P_\Omega x]_n = \begin{cases} [x]_n & n \in \Omega \\ 0 & \text{otherwise} \end{cases}. \quad \text{Equation (7)}$$

For ease of notation, it will be appreciated that every element-wise operation that involves an $\infty$ value can be determined by ignoring or omitting it from the computation. For example, the following summation ignores the $\infty$ values by using the equality $$\sum_{\phi \in \Phi} [y^\phi]_n = \sum_{\phi \in \Phi} [y^\phi]_n \cdot 1\{[y^\phi]_n < \infty\}. \quad \text{Equation (8)}$$

B. Map-perspective Selection, De-noising and Fusion (Steps 330, 340)

A fusion model is proposed herein of the map-perspective patch images in the gradient domain. This model consists in the weighted average of the map-perspective gradients $D_y \phi$ obtained from each of the available $y^\phi$ (with $\infty$ values ignored as the example in Equation (8)). In other words, according to one embodiment, fusion may be carried out in the gradient domain by $$\widetilde{Dy} = \sum_{\phi \in \Phi} w_\phi Dy^\phi. \quad \text{Equation (9)}$$

The vector of weights $w \in \mathbb{R}^{|\Phi|}$ is chosen here to be a sparse vector that selects map-perspective patch images $y^\phi$ via its non-zero entries. In other words, the best sparse representation of an overall averaged isotropic gradient of map-perspective patch images may be found. One reason for this is that it may be desirable to so-called 'penalize' or even remove some map-perspective patch images from the reconstruction process (e.g., select a subset, step 330). To achieve this, weights may be found that minimize the isotropic sparse promoting least squares optimization problem $$\hat{w} = \underset{w \in W}{\operatorname{argmin}} \{\mathcal{D}_1(w) + \lambda \mathcal{R}(w)\}, \quad \text{Equation (10)}$$

where minimization is carried out over a fidelity term $\mathcal{D}_1 : \mathbb{R}^{|\Phi|} \to \mathbb{R}$ and a regularization term $\mathcal{R} : \mathbb{R}^{|\Phi|} \to \mathbb{R}$ controlled by the regularization parameter $\lambda > 0$. In this instance, the fidelity term may be defined by $$\mathcal{D}_1(w) = \frac{1}{2} \left\| \sum_{\phi \in \Phi} |Dy^\phi| - \sum_{\phi \in \Phi} |Dy^\phi| \right\|_{l_2}^2 \quad \text{Equation (11)}$$

which promotes consistency between the weighted average and the average of map-perspective gradients (or transform patch images). The second regularization term $$\mathcal{R}(w) = \|w\|_{l_1} \quad \text{Equation (12)}$$

may promote sparse solutions controlled by the parameter $\lambda > 0$ which determines the sparseness strength. In other words, this parameter can control the number of map-perspective patch images $y^\phi$ that will go into the fusion (step 330) and map reconstruction (step 350).

The problem in Equation (10) involving the non-convex functional in Equation (12) can be solved iteratively using a proximal gradient algorithm. This involves the alternate application of a gradient-descent step on the fidelity term in Equation (11) followed by the application of the non-linear soft-thresholding operator $\eta_\tau(\cdot) : \mathbb{R}^N \to \mathbb{R}^N$ defined element-wise by $$[\eta_\tau(x)]_n = \operatorname{sgn}(|x|_n)(|[x]_n| - \tau)_+ \quad \text{Equation (13)}$$

to promote sparsity of the solution at each iteration. The accelerated implementation of this algorithm is known as fast iterative shrinkage thresholding algorithm (FISTA) which converges with a rate of $O(1/k^2)$. A summary of the map-perspective selection algorithm based on FISTA is given in Algorithm 1 set forth below.

Algorithm 1 Fusion of the gradient field with (9)

1: input: Map-perspective gradient $Dy^\phi$ for $\phi \in \Phi$, step $\gamma > 0$, and thresholding constant $\tau > 0$.
2: set: $t \leftarrow 1$, $q_0 \leftarrow 1$
3: repeat
4: $s^t \leftarrow \eta_\tau(s^{t-1} - \gamma \nabla \mathcal{D}_1(s^{t-1}))$
5: $q_t \leftarrow \frac{1}{2}\left(1 + \sqrt{1 + 4q_{t-1}^2}\right)$
6: $w^t \leftarrow s^t + ((q_{t-1} - 1)/q^t)(s^t - s^{t-1})$.
7: $t \leftarrow t + 1$ -continued Algorithm 1 Fusion of the gradient field with (9)

8: until: stopping criterion
9: return: Fused gradient $D\hat{y} = \sum_{\phi \in \Phi} w_\phi^t Dy^\phi$ Fusion of the map-perspectives gradients could be further improved by using a de-noising algorithm on each gradient component. Under this scenario Equation (9) could be modified and a de-noising function may be applied to the gradient field term as $$\widetilde{Dy} = \sum_{\phi \in \Phi} w_\phi \cdot g_\tau(Dy^\phi), \quad \text{Equation (14)}$$

where $g_\tau : \mathbb{R}^{N \times 2} \to \mathbb{R}^{N \times 2}$ is again the non-linear soft-thresholding de-noising function applied independently to each of the horizontal and vertical gradient components (i.e., to each of the respective transform patch images). One application of this de-noising function is summarized in Algorithm 3 set forth below. In the imaging community, this de-noising idea is referred to as total variation.

Algorithm 3 Anisotropic FISTA for denoising Gradients.

1: input: Map-perspective gradient Dy, regularization parameter $\lambda$, step $\gamma$, and thresholding constant $\tau$.
2: for each component field $k \in \{x,y\}$
3: set: $t \leftarrow 1$, $s^0 \leftarrow D_k y$
4: repeat
5: $s^t \leftarrow \eta_\tau(s^{t-1} - \gamma \nabla \mathcal{D}_3(s^{t-1}))$
6: $q_t \leftarrow \frac{1}{2}(1 + \sqrt{1 + 4q_{t-1}^2})$
7: $D_k x^t \leftarrow s^t + ((q_{t-1} - 1)/q^t)(s^t - s^{t-1})$.
8: $t \leftarrow t + 1$
9: until: stopping criterion
10: return: De-noised gradient of map-perspective $Dx^t$ C. Map reconstruction I Step 350

Step 350 includes the reconstruction of a map patch image of ground reflectivity based on the output of the fusion process (step 340). Application of step 350 reconstructs a map patch image of reflectivity as opposed to a map of gradients (i.e., instead of a map of the transform patch images). According to one embodiment, $\widehat{Dy} = f_{fusion}(y^1, y^2, \ldots, y^B)$ is used to compactly denote an estimate of the fused gradient of map-perspective patch images. Reconstruction is then carried out by minimizing a cost function on x based on Poisson's formulation. Here, this problem is posed as an $\ell_2$ term promoting consistency with the fused gradient of map-perspective patch images and a term that ensures equality constraints with reference measurement data on a subset $\partial \Omega \in \Omega'$ of elements of x. This definition of $\partial \Omega$ is used for consistency with Poisson image editing (as will be appreciated by those skilled in the art), although this set does not necessarily represent a boundary.

Based on this description, the digital map patch image of ground reflectivity can be recovered by solving the following optimization $$\hat{x} = \underset{x \in \chi}{\operatorname{argmin}} \left\{ \frac{1}{2} \sum_{k = \{x,y\}} \|D_k \hat{y} - D_k x\|_{l_2}^2 \right\}, \quad \text{Equation (15)}$$

s.t. $x_{\partial \Omega} = x_{\partial \Omega}^*$.

The so-called minimizer of Equation (15) can be a unique solution to the equivalent Poisson equation with Dirichlet boundary conditions problem posed in matrix form as:

$$I_\Omega L x = I_\Omega [D_x^2 y + D_y^2 y], \text{ s.t. } x_{\partial\Omega} = x^*_{\partial\Omega} \quad \text{Equation (16)}$$

where $L: \mathbb{R}^N \to \mathbb{R}^N$ is a discrete Laplacian operator defined in the equation in equation $$[Lx]_n = -4[x]_{n+1} + [x]_{n-1} + [x]_{n+N_y} + [x]_{n-N_y},$$

To simplify, Equation (16) may be cast in a form such that optimization is carried out only on the entries in the domain of $\Omega = \partial\Omega^c$ representing the cell locations where reconstruction is to be performed, since $x_{\partial\Omega}$ is already known. To accomplish this, we can use the projection and sampling operators defined in Equations (7) and (6), respectively, and rewrite Equation (16) as the minimization problem:

$$\hat{x}_\Omega = \underset{x_\Omega \in \chi_\Omega}{\arg\min}\{\mathcal{D}_2(x_\Omega)\}, \text{ and } \hat{x}_{\partial\Omega} = x^*_{\partial\Omega} \quad \text{Equation (17)}$$

where $D2: \mathbb{R}^{|\Omega|} \to \mathbb{R}$ represents the fidelity term that satisfies Equation (16) over the domain $\Omega$. In other words, $$\mathcal{D}_2(x) = \tfrac{1}{2} \|\Phi x - b\|_{E_2}^2 \quad \text{Equation (18)}$$

with $\Phi$ representing the $\Omega$ projected and sampled Laplacian version of the left hand side of the first equality in Equation (16) and b represents the right side of the first equality in Equation (16) with incorporation of the Laplacian projection of the second equality constraint. Mathematically, these two terms are defined via $$\Phi = I_\Omega L P_\Omega I_\Omega^T \text{ and } b = I_\Omega[D_x^2 y + D_y^2 y - L P_{\partial\Omega} x^*] \quad \text{Equation (19)}$$

where the superscript $^T$ denotes a vector/matrix transpose. Since the cost functional in Equation (18) is convex, the accelerated gradient projection method of Nesterov (known to skilled artisans) may be relied upon which involves the previous two iterations at each iteration to achieve a rate of convergence of $O(1/k^2)$. This iterative method is summarized here in Algorithm 2 set forth below.

---

Algorithm 2 Reconstruction of the map of ground reflectivity

1: input: Fused gradient of map-perspectives Dy, reference $x_{\partial\Omega}^*$ and step $\gamma > 0$.
2: set: $t \leftarrow 1$
3: repeat
4:    $s^t \leftarrow s^{t-1} - \gamma \nabla \mathcal{D}_2(s^{t-1})$
5:    $q_t \leftarrow \tfrac{1}{2}(1 + \sqrt{1 + 4q_{t-1}^2})$
6:    $x_\Omega^t \leftarrow s^t + ((q_{t-1} - 1)/q^t)(s^t - s^{t-1})$.
7:    $t \leftarrow t + 1$
8: until: stopping criterion
9: set: $\hat{x}_{\partial\Omega} \leftarrow x_{\partial\Omega}^*, \hat{x}_\Omega \leftarrow x_\Omega^t$
10: return: Map of ground reflectivity $\hat{x}$

---

To define $x^*_{\partial\Omega}$ and the set $\partial\Omega$ there are several alternatives that could be used. The implementation that follows is merely an example; others could be also be used. The method simply consists on choosing at least one map-perspective patch image $y^{\phi_1}$ characterized with a strong gradient magnitude compared to others within some region (e.g., $|[D(y^{\phi_1})]_n| > |[D(y^{\phi})]_n|$; for some $n \in \Omega^{\phi_1} \cap \Omega^\phi; \forall \phi \neq \phi_1$ if it exists). From the map-perspective patch image $y^\phi$, the subset $\partial\Omega$ may be extracted (and the reflectivity values from the entries in $\partial\Omega$ may be used to construct a reference. In other words, once $\partial\Omega$ is defined, $x^*_{\partial\Omega} = y_{\partial\Omega}^{\phi_1}$ and $x^*_\Omega$ may be set to any value, since the later elements are not used in the optimization, e.g., Equation (18). The elements of $\partial\Omega$ can be extracted from $y^{\phi_1}$ as the entries with the most-likely reflectivity value, in other words.

$$\partial\Omega = \left\{ n \mid [y^{\phi_1}]_n = \underset{y}{\arg\max} p_{y\phi_1}(y^{\phi_1}) \right\}.$$

The presence of a maximum peak in the distribution can be justified with the one-point statistic of raw reflectivity which follows a Laplacian distribution.

Once the construction of the map patch image is complete, it may be stored in some embodiments in database 84 (step 360) and/or other map patch images may be constructed similarly (step 370), as discussed above. It should be appreciated that a similar process may be carried out by the computer or mapping module 30 in the vehicle 14. Further, having constructed map patch image(s), the vehicle 14 may utilize the map patch image(s) to facilitate autonomous or at least partially autonomous driving modes. Furthermore, localization data may be provided to the server 12 in any suitable form—e.g., sets of map-perspective patch images, sets of transform patch images, subsets of transform patch images, a single fused patch image for a given set, identified map-perspective patch images having a stronger gradient than others within the set, constructed map patch images, etc.

Further, according to one embodiment, it is contemplated that numerous other vehicles such as vehicle 14 provide similar localization data to the server 12. Thus, the method described herein may be carried out according to so-called 'big data' methods, wherein potentially thousands or millions of vehicles could be providing localization data to server 12 (or a suite of servers like server 12).

De-Noising the Transform Patch Image Embodiments

In at least some embodiments, additional noise may be removed to improve the contrast and quality of the map patch image constructed in method 300. Here, presented is one embodiment using a $\ell 1$ regularized least squares algorithm proposed to de-noise the gradient-field. This algorithm uses a so-called soft-thresholding technique.

The discrete gradient field operator $D: \mathbb{R}^N \to \mathbb{R}^{N \times 2}$ can be composed of the matrices Dx and Dy that represent the first order finite forward difference operators along the horizontal and vertical axes, respectively. Assuming a column-wise vectorization of a 2D signal of size Ny×Nx, the discrete forward gradient field operator can then be defined point-wise as $$[Dx]_n = \begin{pmatrix} [D_x x]_n \\ [D_y x]_n \end{pmatrix} = \begin{pmatrix} [x]_{n+N_y} - [x]_n \\ [x]_{n+1} - [x]_n \end{pmatrix}. \quad \text{Equation (20)}$$

In a similar way, the discrete Laplacian operator $L: \mathbb{R}^N \to \mathbb{R}^N$ is defined point-wise as $$[Lx]_n = -4[x]_{n+1} + [x]_{n+N_y} + [x]_{n-N_y} \quad \text{Equation (21)}$$

To de-noise the map-perspective of an observer we propose here to apply a soft-thresholding de-noising method to the map-perspective gradients. This method consists on solving the sparse promoting least squares optimization $$D_k x = \underset{D_k x \in \chi_D}{\arg\min} \{\mathcal{D}_3(D_k x) + \lambda \mathcal{R}(D_k x)\}, \quad \text{Equation (22)}$$

for each horizontal and vertical k={x, y} directions, respectively. Here, the parameter λ>0 controls the amount of regularization (i.e., sparsity). The first term in Equation (22) measures the gradient fidelity defined in the least squares sense as $$\mathcal{D}_3(D_k x) = \frac{1}{2}\|D_k x\|_{\ell_1}. \quad \text{Equation (23)}$$

while the second term is the non-smooth ℓ1 sparse promoting regularizer defined by $$\mathcal{R}_3(D_k x) = \frac{1}{2}\|D_k y - D_k x\|_{\ell_2}. \quad \text{Equation (24)}$$

The optimization in Equation (22) can be iteratively solved using the accelerated gradient descent method (known to those skilled in the art) along with the non-convex proximity projection method (also known to those skilled in the art). The complete algorithm has a rate of convergence of O(1/k2).

Testing/Experimentation

Testing and experimentation has been conducted to verify the proposed approach and method 300 described above. For example, Ford campus vision and LIDAR datasets were used, as well as datasets derived from autonomous vehicle fleet testing. These fleet vehicles were outfitted with four Velodyne HDL-32E 3D-LIDAR scanners and an Applanix POS-LV 420 (IMU). The four HDL-32E's were mounted on the roof above the B pillars of the vehicle; two which rotate in an axis perpendicular to the ground and two in a canted orientation. Datasets were all collected in metropolitan areas and inside the Ford campus in Dearborn, Mich. Time-registered Velodyne datasets were stored which contain points of Cartesian coordinates from which a LIDAR pulse reflection was recorded, a reflectivity measurement for each of these points, laser beam information and other additional fields. To properly project range scans into a common local reference frame incoming from multiple LIDAR sensors in different positions along the car, a generalized iterative closest point (GICP) algorithm was used to extrinsically calibrate them. This algorithm iteratively optimizes for the 6 DOF parameters that align the overlapping range scans. When mapping, all the range scans are projected into a global reference frame using the pose estimate of the car obtained through integration of the GPS, IMU and odometry. The poses of these range scans are posteriorly corrected with full simultaneous localization and mapping (SLAM) which maximizes the likelihood of the map and vehicle positions given the position and 3D LIDAR measurements.

The data used to test this approach used only the measurements incoming from two LIDARs which scanned the environment through a 360-degree rotation along an axis perpendicular to the ground. Under this configuration, the angle of incidence and range per laser recorded from the ground remain approximately constant over the course of the 360-degree laser scan trip. Thus, each laser beam index implicitly accounted for the angle of incidence and range (i.e., a single perspective per laser observer throughout its entire 360-degree scan). As such, there will be a total of B=64 map-perspectives, one for each observer. Note that when running the algorithm, the map was fixed to any orthographic view of the 2-D ground-plane and all the processing was performed with this view fixed. To establish the performance of the method in comparison to state of the art, the test was conducted against a practical implementation of Levinson's and Thrun's 'Robust vehicle localization in urban environments using probabilistic maps'. The data used for comparison was the same as the one used to test the novel method discussed above, except that in testing the novel method set forth above, measurements from all the four LIDARs were included—two in a canted orientation. The primary differences between the Levinson's and Thrun's implementation versus the novel method set forth above was use of an approximation that enabled the generation of the look-up table in one-pass through the data and the inclusion of an angle of incidence dependency for the canted LIDARs. To compare against the Levinson's and Thrun's implementation/method, the range scan projection and alignment mentioned at the beginning of this Testing/Experiment section was used. Subsequently, calibration transformations were estimated that generate the most likely reflectivity estimate when applied to the measurements. This calibration was applied to all of the reflectivity measurements before fusing to generate a map of the ground-plane. Notably, the map-data used to generate the calibrations was the same one used to generate the maps against which the method was compared.

Given that maps of the ground surface can be very extensive, the implementation of the method is applied independently on disjoint patches or sections of the map of size 400×400 cells (i.e., a patch was 400 cells×400 cells). The method was flexible enough to use other sizes also with the only constraint of a size large enough such that the gradient field was spatially informative. In what follows, the algorithm parameters that were used in practice to obtain the results are indicated. First, the search spaces are defined as $X=\{x\in\mathbb{R}^N: 0\le x\le 255\}$, $X_\Omega=\{x_\Omega\in\mathbb{R}^\Phi: 0\le x\Omega\le 255\}$, $X_D=\{D_k x\in\mathbb{R}^N: -255\le D_k x\le 255\}$ used in Equations (15), (17), (22), (10), respectively (note: Equations (20)-(24) are follow the Testing/Experiments discussion).

Second, to select the sparse set of perspectives via the weights W using Algorithm 1, it was found that the algorithm converges in less than K=100 iterations. The parameters that were used in the algorithm were a regularization strength of λ=1.2e−3 along with a step-size in the direction of the gradient of γ=1e−3. To apply the soft-thresholding operator a thresholding constant of τ=2.3e−3 was used. Under these settings, approximately 5/64 perspectives were selected to sparsely represent the overall fused gradient field. In a similar way, the same parameter settings used in the perspective selection were applied to de-noise the gradient-field using Algorithm 3—denoted by subscript d. For the reconstruction Algorithm in 2, it was found in the experiments that the relative energy step in two successive iterations $\|x_\Omega^t - x_\Omega^{t-1}\|_{\ell_2}/\|x_\Omega^{t-1}\|_{\ell_2} < \delta_r$ for $\delta_r=1e^{-3}$ or a maximum number of iterations K=256 was sufficient to yield good quality reconstructions. In the discussion below, several example cases are included that show that the method outperforms the quality of state of the art calibration based approaches using these parameters.

A. Contrast Enhancement

Here, it is shown how the method results in maps of the ground reflectivity of better quality. For this, FIG. 10 includes a comparison between the state of the art calibration and the approach set forth above when surveying a parking lot. All of the illustrations in this section and in the subsequent are shown in the same reflectivity scale of [0, . . . , 255]. FIG. 10 includes: contrast enhancement in ground reflectivity maps under weather adverse conditions (i.e., ice patches on the ground). (a,c) Patch examples generated from calibrated measurements [patch of map generated from calibrated measurements], (b,d) Patch examples reconstructed with the disclosed method. Note: gray scale value represents reflectivity. To continue, FIGS. 10(a) and 10(c) show two example map patches of the results one would get with the calibration based Levinson's and Thrun's 'Robust vehicle localization in urban environments using probabilistic maps' deterministic method, while FIG. 10(b) and FIG. 10(d) show the corresponding results one would get using the method 300. Note that the method 300 approach yields significantly better contrast between asphalt and markings, even in the situation when Levinson's and Thrun's method yielded markings that were close to be indistinguishable from the background. Moreover, asphalt regions which should have been of uniform reflectivity appear now to be more uniform compared to the results in FIGS. 10(a) and 10(c), while also enhancing contrast.

B. Artifact Removal

In certain circumstances that occur frequently, it has been discovered that the conditions under which the surveying vehicle navigates impacts the map generation by means of the appearance of artifacts in the map. These artifacts have been observed also in other research works, for example even after applying the laser reflectance calibration in Levinson's and Thrun's 'Automatic online calibration of cameras and lasers' method and Levinson's and Thrun's 'Unsupervised calibration for multi-beam lasers' method. Here included are examples which show three types of artifacts generated under three common navigating conditions while surveying. To show these artifacts, the map generated using only the average of all of the laser reflectivity measurements was used without considering their origin nor dependencies on the sources of variation. Here denoted are these with the term raw naïve fusion.

Figure 11:
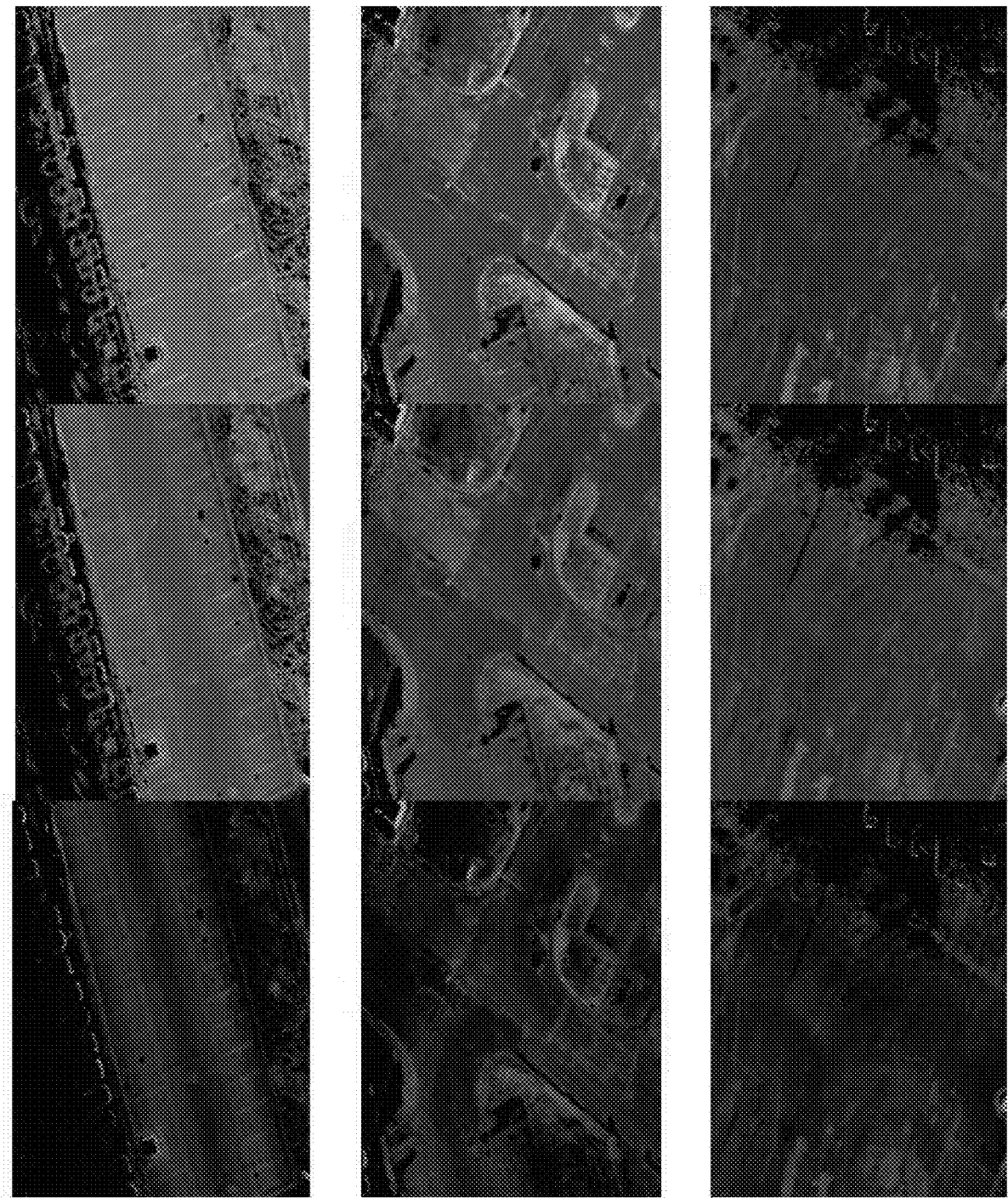
FIG. 11 illustrates artifact images obtained during testing and experimentation.

FIG. 11 includes a comparison of artifact correction generated by predominant laser beams at certain cells. (a,d,g) Reflectivity at each cell is given by the expectation over all raw reflectivity measurements associated with the cell [raw naïve fusion], (b,e,h) Same as (a) but with calibrated reflectivity [Levinson & Thrun], (c,f,i) The disclosed method. More particularly, FIG. 11(a) shows for example the circular artifact that is generated close to the middle of the road. This artifact pattern coincides with the pattern followed by the laser while undergoing a full 360-degree scan flight, and is generated because there are some regions that contain measurements only from a small subset of lasers whose reflectivity predominate. This artifact appears consistently when the surveying car is driven at speeds >6 meters/second. FIG. 11(b) shows the generated result when we used a prior art calibration method (Bostan's Nilchian's and Unser's 'Sparse stochastic processes and discretization of linear inverse problems'). This method eliminated the generated artifact, although, it also smoothed lane markings, thus reducing contrast. FIG. 11(c) of this case shows the result obtained with method 300. Note that a great deal of the artifact is removed while also preserving and enhancing (with respect to FIGS. 11(a) and 11(b) the contrast between lane markings and asphalt.

In contrast, FIG. 11(d) shows an artifact example generated when the vehicle stops for a moment while surveying. In this case, the artifact was generated while waiting at a stop sign for a time lapse >5 seconds at an intersection. In a similar way to the previous case, the artifact generated follows the patterns of the lasers when these are ongoing the 360-degree scanning trajectory around the vehicle. Lasers characterized with a higher responsivity dominate the regions reflecting them, thus generating reflectivity discontinuities. FIG. 11(e) shows the result of applying the prior art pre-calibration step on a section of the map (Levinson's and Thrun's 'Unsupervised calibration for multi-beam lasers'). This method removed a great deal of the artifact, although not in its entirety. The pattern followed by the scanning of the lasers around the vehicle can still be perceived while also there is a loss in contrast. Finally shown is the result of applying the reconstruction method 300 in FIG. 11(f). Note that the artifact is completely gone and that the contrast is enhanced.

The last case presents the artifact that was generated in a patch of the map when the vehicle is surveying and undergoes a U-turn. This artifact illustrated in FIG. 11(g) presents patterns similar to the ones presented in the previous cases. FIG. 11(h) shows the result obtained by means of applying the prior art calibration technique: Levinson's and Thrun's 'Unsupervised calibration for multi-beam lasers.' The artifact generated in the U-turn is eliminated, but again at the cost of a reduced contrast. In contrast, our method illustrated in FIG. 11(i) improves the quality of the reconstruction, eliminating also the artifact with an enhanced contrast.

C. De-noising

Here included are results to show how method 300 allows some level of freedom to yield maps of the ground with certain quality characteristics at the cost of a computational complexity trade-off. For example, included are the possibility of either including or removing the map-perspective selection operator to yield maps of better quality. Further could be included or removed is the de-noising step described in Equation (14) to de-noise or to smooth regions in which it is desired to have a more uniform reflectance while keeping important edges. Different performances can be obtained by adjusting the parameters of Algorithm 1 and Algorithm 3. Here, included is a representative example that illustrates the differences between the quality of maps of the ground plane that can be reconstructed by combinations of the aforementioned adjustments. Four cases are shown here, these are: (1) Uniform fusion weights (i.e., $w_\phi=1$ in Equation (9)) and no de-noising; (2) Uniform fusion weights with the de-noising of Equation (14) applied; (3) Regularization strength setting of $\lambda=1.2e-3$ in Equation (10) that optimizes for a sparse map-perspective selection vector of cardinality $|supp(w)|=5$ with no de-noising; and (4) that uses the same regularization strength adjustment in case (3) but with de-noising as in Equation (14) applied.

Figure 12:
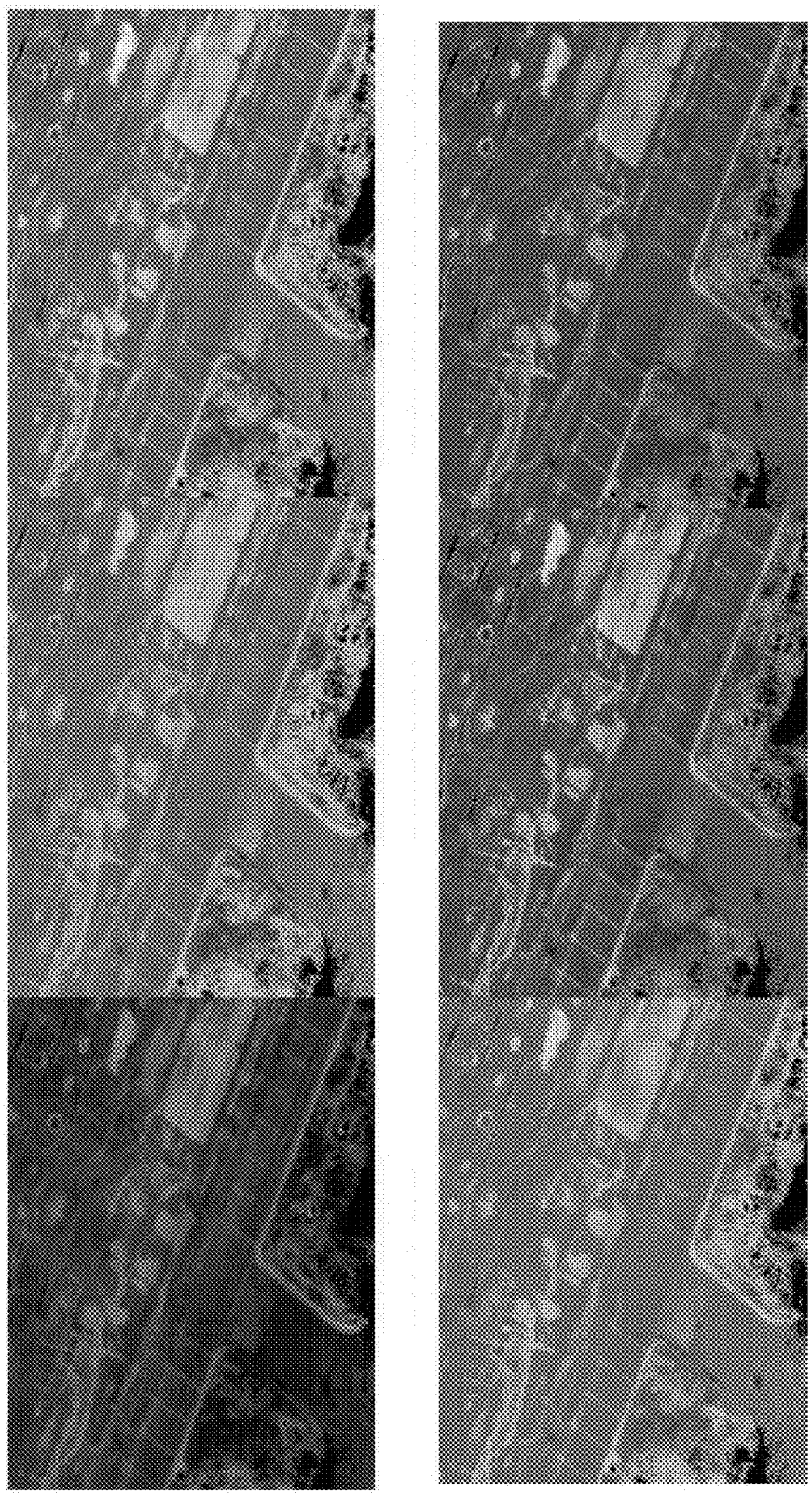
FIG. 12 illustrates a comparison of experimental calibration images with experimental images generated according to the method set forth in FIG. 3.

FIG. 12 includes map patches of ground reflectivity. (a) corresponds to raw naïve fusion [naïve fusion], (b) corresponds to a calibrated map [calibrated fusion], (c) corresponds to reconstruction with the disclosed method using a uniformly weighted average fusion of the gradient fields [mean fusion no denoising (the disclosed method], (d) same as (c) but with denoising applied to the gradient fields [mean fusion with denoising (the disclosed method)], (e) corresponds to map reconstruction with the disclosed method by fusing only the top five map-perspectives in specific patch sections [top 5 fusion no denoising (the disclosed method)], (f) same as (e) but with denoising applied to the gradient fields [top 5 fusion with denoising $\lambda_d=1.2e-3$ (the disclosed method)]. FIG. 12 shows a comparison between the aforementioned cases with the naive fusion (i.e., no pre-calibration) shown in FIG. 12(a) and with the calibrated fusion (i.e., Levinson's and Thrun's 'Robust vehicle localization in urban environments using probabilistic maps' deterministic method) in FIG. 12(b). The obtained results with the 4 aforementioned adjustment cases (1), (2), (3) and (4) are included in FIG. 12(c)-(f), respectively. Note that even in the case when neither a map-perspective selection (i.e., uniform weights in Equation (9)) nor a de-noising step is applied, the reconstruction of the map section shown in FIG. 12(c) results in better contrast and reflectivity uniformity compared to the naive and calibrated fusion methods. This performance is consistent in other map regions and even achieves also elimination of the artifacts that could arise, as described above. FIG. 12(d) is also the result of map patch reconstruction with uniform weights as in FIG. 12(c) but with de-noising. Note that the resulting map section appears to be smoother than FIG. 12(c) while also maintaining edge sharpness for example in lane markings. Finally, FIG. 12(e) and FIG. 12(f) are shown; these illustrate the results obtained by adjusting the regularization strength by means of λ in Equation (10) that results in general in a map-perspective selection of 5 perspectives, in the two cases: without de-noising and with de-noising, respectively. Consistency has been found in that using the method of map-perspective sparse selection of the best perspectives result in maps with better contrast, but with higher noise level. The reason is that in the case when all the map-perspectives are used, more perspectives are averaged thus naturally reducing the noise level and smoothing the map without losing sharpness details. For this reason, it has been found that in general, it is suitable to include a de-noising step in the case when the map-perspective selection is used. The patch of the map reconstruction result under this scenario is shown in FIG. 12(f). Note that the map is smoother in comparison to the result with no de-noising.

D. Weather Adverse Conditions

Here, it was compared the performance of the reconstruction in a map section where there were patches of ice on the road. Here, shown is a representative case of the reconstruction performance with the naive averaging method and method 300, see FIG. 10(a)-(b), respectively. Note that in these cases, lane markings are lost under the ice with the naive fusion. With method 300 however, even some of the lane markings which were completely lost can now be distinguished while removing the reflectivity variations caused by the non-uniform laser responses and the vehicle navigation.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores 74 described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising a processor and memory that stores processor-executable instructions, wherein the processor is programmed to:
   receive a plurality of map-perspective patch images of a physical region near a vehicle and imaged by at least one laser scanner on the vehicle, wherein each of the plurality of map-perspective patch images represent a measure of ground reflectivity;
   generate a plurality of transform patch images by applying a mathematical transform operator to at least some of the plurality of map-perspective patch images;
   determine, from among the plurality of transform patch images, at least two of the plurality of transform patch images having the largest gradients;
   combine the at least two of the plurality of transform patch images into a single patch image; and construct a map patch image using the single patch image and at least one of the plurality of map-perspective patch images.

2. The computer of claim 1, wherein the at least one laser scanner is a light detection and ranging (LiDAR) device.

3. The computer of claim 1, wherein the transform operator includes one of a discrete differentiation gradient operator, a discrete Fourier operator, a discrete wavelet operator, a Radial basis operator, a Noiselet operator, a Curvelet operator, or a Laplacian operator.

4. The computer of claim 1, wherein the processor is programmed to, in combining the at least some of the plurality of transform patch images, determine a subset of the plurality of transform patch images, wherein only the subset is combined into the single patch image.

5. The computer of claim 1, wherein the processor is programmed to, in combining the at least some of the plurality of transform patch images, execute an algorithm that includes:

--- input: $Dy^\phi$ for $\phi \in \Phi$, step
$\gamma > 0$, and thresholding constant $\tau > 0$.
set: $t \leftarrow 1$, $q_0 \leftarrow 1$
repeat
   $s^t \leftarrow \eta_\tau(s^{t-1} - \gamma \nabla \mathcal{D}_1(s^{t-1}))$
   $q_t \leftarrow \frac{1}{2}(1 + \sqrt{1 + 4q_{t-1}^2})$
   $w^t \leftarrow s^t + ((q_{t-1} - 1)/q^t)(s^t - s^{t-1})$.
   $t \leftarrow t + 1$
until: a stopping criterion
return: $D\hat{y} = \sum_{\phi \in \Phi} w_\phi^t Dy^\phi$.

---

6. The computer of claim 5, wherein the processor is programmed to, in combining the at least some of the plurality of transform patch images, prior to executing the algorithm, select a subset of transform patch images according to a formula, wherein only the subset is combined into the single patch image, wherein the formula includes:

$$\hat{w} = \arg\min_{w \in \mathcal{W}} \{\mathcal{D}_1(w) + \lambda \mathcal{R}(w)\},$$

where minimization is carried out over a fidelity term $\mathcal{D}_1$: $\mathbb{R}^{|\Phi|} \to \mathbb{R}$ and a regularization term $\mathcal{R}(w): \mathbb{R}^{|\Phi|} \to \mathbb{R}$ controlled by a regularization parameter $\lambda > 0$, wherein the fidelity term is:

$$\mathcal{D}_1(w) = \frac{1}{2}\left\|\sum_{\phi \in \Phi}|Dy^\phi| - \sum_{\phi \in \Phi} w_\phi |Dy^\phi|\right\|_{l_2}^2$$

which represents a fidelity term between a weighted average and an average of at least some of the plurality of transform patch images, wherein the regularization term is:

$\mathcal{R}(w) = \|w\|_{l_1}$.

7. The computer of claim 1, wherein the processor is programmed to, in combining the at least some of the plurality of transform patch images, increase signal-to-noise in the map patch image by ignoring at least some of the plurality of transform patch images.

8. The computer of claim 1, wherein the processor is programmed to, in constructing the map patch image, execute an algorithm that includes:

--- input: the single fused patch image Dy, the at least one of the plurality of map-perspective patch images $x_{\partial\Omega}^*$ and step $\gamma > 0$.
set: $t \leftarrow 1$
repeat
   $s^t \leftarrow s^{t-1} - \gamma \nabla \mathcal{D}_2(s^{t-1})$
   $q_t \leftarrow \frac{1}{2}(1 + \sqrt{1 + 4q_{t-1}^2})$
   $x_\Omega^t \leftarrow s^t + ((q_{t-1} - 1)/q^t)(s^t - s^{t-1})$.
   $t \leftarrow t + 1$
until: a stopping criterion
set: $\hat{x}_{\partial\Omega} \leftarrow x_{\partial\Omega}^*$, $\hat{x}_\Omega \leftarrow x_\Omega^t$
return: the map patch image $\hat{x}$.

---

9. The computer of claim 1, wherein the processor is programmed generate a digital map file by combining the constructed map patch image and at least one additionally constructed map patch image generated by repeating the receiving, generating, combining, and constructing steps using a different plurality of map-perspective patch images.

10. The computer of claim 1, wherein the processor is programmed to, prior to combining the at least some of the plurality of transform patch images, apply a de-noising function to at least some of the plurality of transform patch images.

11. The computer of claim 1, wherein the processor is programmed to, in combining the at least some of the plurality of transform patch images, apply a de-noising function to the at least some of the plurality of transform patch images during fusion.

12. The computer of claim 1, wherein the processor is further programmed to, use the map patch image to operate the vehicle in an at least partially autonomous mode.

13. The computer of claim 1, wherein the computer is a remote server receiving wired or wireless data uploads from the vehicle or the computer is located within the vehicle and coupled to the at least one scanner.

14. The computer of claim 1, wherein the plurality of map-perspective patch images is captured without a calibration sequence of the at least one scanner.

15. A method, comprising:
  at a computer in a vehicle:
    receiving a plurality of uncalibrated map-perspective patch images of a physical region near the vehicle and imaged by at least one scanner on the vehicle, wherein each of the plurality of uncalibrated map-perspective patch images represent a measure of ground reflectivity;
    generating a plurality of transform patch images by applying a mathematical transform operator to at least some of the plurality of map-perspective patch images;
    determining, from among the plurality of transform patch images, at least two of the plurality of transform patch images having the largest gradients;
    combining the at least two of the plurality of transform patch images into a single fused patch image; and
    constructing a map patch image using the fused patch image and at least one of the plurality of map-perspective patch images.

16. The method of claim 15, wherein the transform operator includes one of a discrete differentiation gradient operator, a discrete Fourier operator, a discrete wavelet operator, a Radial basis operator, a Noiselet operator, a Curvelet operator, or a Laplacian operator.

17. The method of claim 15, wherein the combining step further comprises executing an algorithm that includes:

```
input: Dy^φ for φ ∈ Φ, step
γ > 0, and thresholding constant τ > 0.
set: t ← 1, q_0 ← 1
repeat
    s^t ← η_τ(s^{t-1} − γ∇𝒟_1(s^{t-1}))
    q_t ← ½ (1 + √(1 + 4q_{t-1}^2))
    w^t ← s^t + ((q_{t-1} − 1)/q^t)(s^t − s^{t-1}).
    t ← t + 1
until: a stopping criterion
return: Dŷ = ∑_{φ∈Φ} w_φ^t Dy^φ.
```

18. The method of claim 15, wherein the constructing step further comprises executing an algorithm that includes:

```
input: the single fused patch image Dy, the at least
one of the plurality of uncalibrated map-perspective
patch images x_{∂Ω}* and step γ > 0.
set: t ← 1
repeat
    s^t ← s^{t-1} − γ∇𝒟_2(s^{t-1})
    q_t ← ½ (1 + √(1 + 4q_{t-1}^2))
    x_Ω^t ← s^t + ((q_{t-1} − 1)/q^t)(s^t − s^{t-1}).
```

```
    t ← t + 1
until: a stopping criterion
set: x̂_{∂Ω} ← x_{∂Ω}*, x̂_Ω ← x_Ω^t
return: the map patch image x̂.
```

19. A computer, comprising a processor and memory that stores processor-executable instructions, wherein the processor is programmed to:
  generate a plurality of transform patch images (PTPIs) by applying a mathematical transform operator to a plurality of map-perspective patch images (PMPPIs) received from at least one vehicle laser-scanner;
  determine, from among the PTPIs, at least two of the PTPIs having the largest gradients;
  combine the at least two of the PTPIs into a single patch image; and
  construct a map patch image using the single patch image.

20. The computer of claim 19, wherein the construction includes merging both the single patch image and one of the PMPPIs.

\* \* \* \* \*